United States Patent
Jachner

(10) Patent No.: US 7,856,478 B2
(45) Date of Patent: Dec. 21, 2010

(54) PRESENCE SYSTEM AND METHOD FOR PROVIDING ACCESS TO WEB SERVICES

(75) Inventor: Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 1396 days.

(21) Appl. No.: 11/315,110

(22) Filed: Dec. 22, 2005

(65) Prior Publication Data

US 2007/0150941 A1 Jun. 28, 2007

(51) Int. Cl.
*G06F 15/16* (2006.01)
(52) U.S. Cl. .................. 709/206; 709/231; 709/204; 709/228; 709/227; 709/205; 719/318; 726/5; 370/235; 370/252; 370/354; 370/260; 455/518; 455/41.2
(58) Field of Classification Search ......... 709/227–229, 709/206, 231, 204, 205, 225
See application file for complete search history.

(56) References Cited

U.S. PATENT DOCUMENTS

2004/0122896 A1* 6/2004 Gourraud .................... 709/204
2005/0228895 A1* 10/2005 Karunamurthy et al. .... 709/229

FOREIGN PATENT DOCUMENTS

WO 03047203 A1 6/2003

OTHER PUBLICATIONS

Liscana, et al.; Projecting Web Services Using Presence Communication Protocols for Pervasive Computing; IEEE International Conference on Wireless and Mobile Computing, Networking And Communications (WiMob'2005); Aug. 22-24, 2005; pp. 98-103.

* cited by examiner

*Primary Examiner*—Jude J Jean Gilles
(74) *Attorney, Agent, or Firm*—Garlick Harrison & Markison

(57) ABSTRACT

A presence system provides access to web services offered by presentities. The presence system includes a presence server for collecting and storing presence information on a presentity and providing the presence information to watchers of the presentity. The presence server further receives from the presentity web service invocation information providing access to one or more web services of the presentity. The presence server provides the web service invocation information of the presentity, along with the presence information of the presentity, to the watchers of the presentity for use by the watchers in invoking the web services of the presentity.

20 Claims, 4 Drawing Sheets

PRESENCE SYSTEM AND METHOD FOR PROVIDING ACCESS TO WEB SERVICES

BACKGROUND OF THE INVENTION

1. Technical Field of the Invention

The present invention relates in general to a presence-based communication system, and in particular, to providing web services through presence systems.

2. Description of Related Art

Presence-based interactive communication systems enable callees (presentities) to publish, in real-time, their presence information, such as the availability and current status of the callee devices/applications, to callers (presence watchers). Presence systems typically incorporate presence servers to manage the presence information for a plurality of presentities. In general, presence servers receive updated presence information from various presence sources, such as telephone applications or instant messaging applications, and aggregate the received presence information to reflect the presence state of the presentities. For example, when a presentity initiates or receives a voice call on his or her desktop phone, the presence server is notified and the presence state of the presentity is changed to "On the Phone."

Presence servers further interface with presence user clients on watcher terminals to provide the current presence state of presentities to watchers of the presentities to assist the watchers in establishing real-time voice, text and/or multimedia communication sessions with the presentities. For example, a presence user client can include a graphical user interface for displaying the real-time presence information on the terminal in the form of icons and/or text strings. In addition, the graphical user interface may also include buttons that enable a user to invoke an action, such as initiating an instant message (IM) communication session or voice call with a presentity, using presentity contact information maintained by the presence user client and/or presence server.

However, current presence systems are not capable of providing access to various web services offered by presentities. For example, if a customer subscribes to the presence information of a company, the customer may want to access web services offered by the company through the presence user client. As an example, if the company is included on the customer's "Buddy List," and while viewing the "Buddy List," the customer realizes that he/she would like real-time information on the status of a service being performed by the company for the customer, the customer may want to "click on" a link to a customer service web page for the company. However, existing presence services only allow the customer to contact the company by e-mail, instant message or voice call. As a result, the customer would need to leave the "Buddy List," log-on to an Internet Service Provider (ISP) and either type in a URL or do a search for a URL to access the customer service web page of the company. Therefore, what is needed is the ability to provide presence-based web services.

SUMMARY OF THE INVENTION

Embodiments of the present invention provide a presence system that provides access to web services. The presence system includes a presence server for collecting and storing presence information on a presentity and providing the presence information to watchers of the presentity. The presence server further receives from the presentity web service invocation information providing access to one or more web services of the presentity. The presence server provides the web service invocation information of the presentity, along with the presence information of the presentity, to the watchers of the presentity for use by the watchers in invoking the web services of the presentity. For example, the web service invocation information can include a link to a website providing one of the web services.

In one embodiment, the web service invocation information associates a respective watcher identity with each of the presentity web services. The presence server provides to at least a select one of the watchers the web service invocation information for a select one of the web services associated with the watcher identity of the select watcher. In another embodiment, the web service invocation information associates a respective presence state of the presentity with each of the presentity web services. The presence server determines a current presence state of the presentity and provides the web service invocation information for a select one of the web services associated with the current presence state to at least one of the watchers.

In a further embodiment, the presence system includes a presence user client associated with a select one of said watchers. The presence user client receives the web service invocation information from the presence server and enables the select watcher to invoke at least one web service of the presentity using the web service invocation information. In still a further embodiment, the presence user client maintains the web service invocation information within a cache. In an exemplary embodiment, the presence server assigns a web service identifier to each of the web services provided by the presentity and provides the web service identifier(s), along with the web service invocation information, to the presence user client of the select watcher. Thereafter, the presence server can provide presence information and a web service identifier associated with the presence information to the presence user client, and the presence user client can index on the cache using the received web service identifier to retrieve and display the web service invocation information for the presence information.

Embodiments of the present invention further provide a method for providing presence-based access to web services. The method includes receiving web service invocation information providing access to one or more web services of a presentity, subscribing watchers to presence information of the presentity and providing the presence information and the web service invocation information of the presentity to the watchers for use by the watchers in invoking the web services of the presentity.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
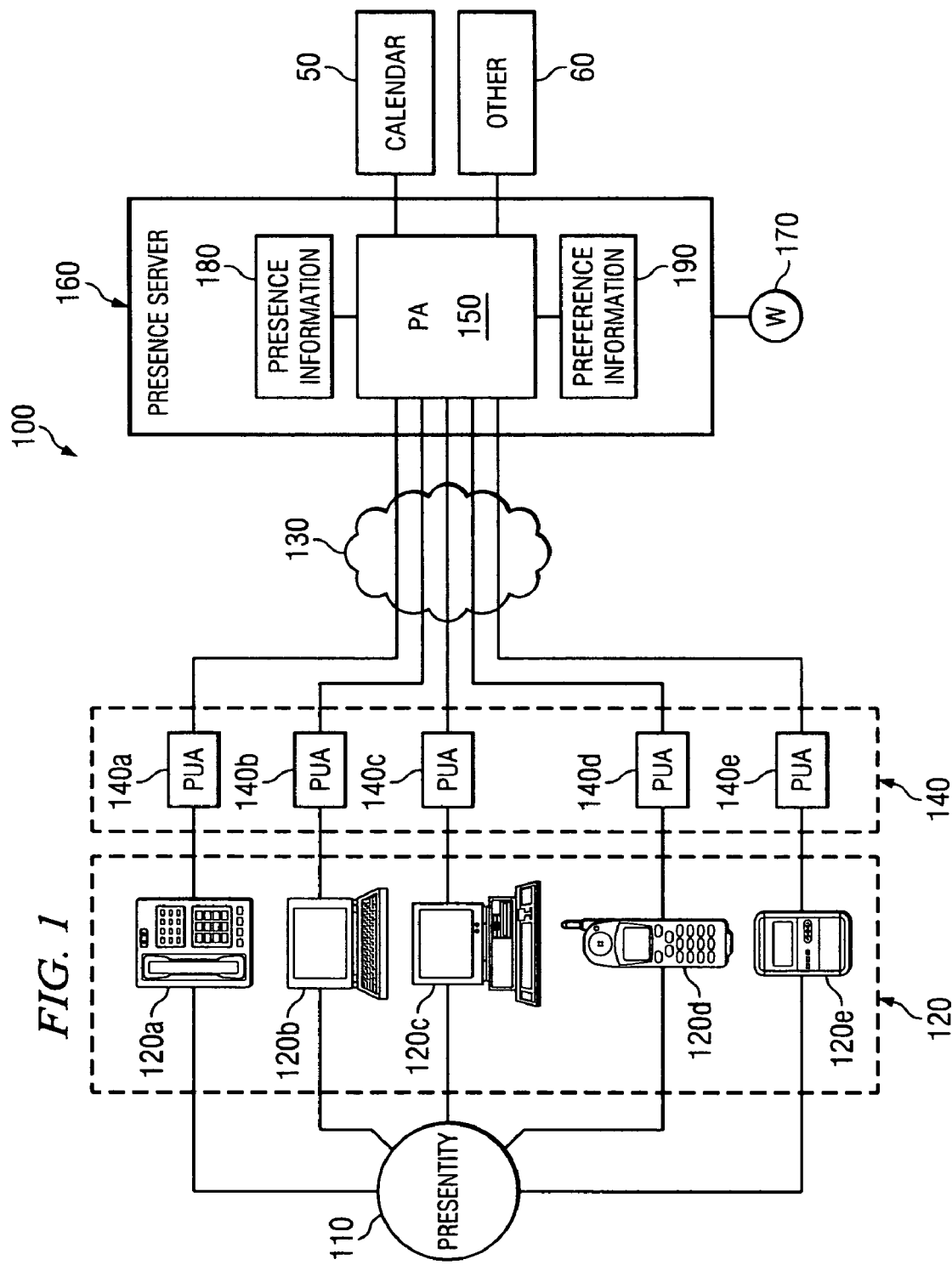
FIG. 1 illustrates an exemplary presence system in accordance with embodiments of the present invention.

Referring to FIG. 1, there is illustrated an exemplary presence system 100 capable of implementing various embodiments of the present invention. The presence system 100 includes one or more presentities (one of which is shown for convenience) 110 and one or more terminals 120 associated with the presentity 110. The presentity 110 represents the callee and provides presence information on the callee's presence state to the presence system 100. Each terminal 120 is a physical communications device capable of sending and/or receiving communications over a communications network 130. Examples of such terminals 120 include, but are not limited to, a desktop phone 120a, a laptop computer 120b, a personal computer 120c, a cell phone 120d and a personal digital assistant (PDA) 120e. Other examples of terminals 120 include web servers and computer networks. In FIG. 1, the communications network 130 represents any type of network over which media (e.g., circuit-switched or packet-switched voice or data) may be sent. For example, the communications network 130 can include the Public Switched Telephone Network (PSTN), Public Land Mobile Network (PLMN), one or more private local area networks (LANs), the Internet and/or any other type or combination of networks.

The presence system 100 further includes one or more presence user agents 140 (PUAs), a presence agent (PA) 150, a presence server 160 and one or more watchers 170 of the presentity 110. The PUAs 140 are capable of manipulating and providing presence information for the presentity 110. In FIG. 1, a separate PUA 140 is shown for each terminal 120. However, it should be understood that in other embodiments, the number of PUAs 140 can vary based on the number and type of terminals 120, the applications supported by the terminals 120 and the system configuration. Each PUA 140 represents an application that independently generates a component of the overall presence information for a presentity 110.

Typically, PUA 140 generates presence information when a change in presence state occurs. Examples of changes in presence state include, but are not limited to, turning on and off a terminal 120, modifying the registration from a terminal 120 and changing the instant messaging status on a terminal 120. As an example, when a presentity initiates or answers a phone call, the PUA 140 notifies the presence server to set the presentity's presence state to "On the Phone." Other examples of changes in presence state include changes in the status of services being provided to watchers 170. As an example, if the presentity is a company currently providing a service to a watcher, when the status of the service changes from "in progress" to "completed," the PUA 140 notifies the presence server to set the presentity's presence state for the watcher to "Completed."

The presence information from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110.

In addition, the PA 150 collects presence information from one or more calendar/scheduler applications 50 (e.g., Microsoft Exchange Server®, IBM Lotus Notes®, Meeting Maker® or other similar application) and other sources 60 of presence information (e.g., an instant messaging application). For example, if a presentity has a meeting scheduled on his or her calendar from 10:00 a.m. to 12:00 p.m., at 10:00 a.m., the calendar/scheduler application 50 notifies the PA 150 to set the presentity's presence state to "In a Meeting."

The PA 150 aggregates the presence information from each of the sources (e.g., PUA's 140, calendar 50 and other sources 60) and maintains the current complete presence information for the presentity 110. The presence information 180 indicates, for example, the availability of the presentity, the current activity of the presentity, the local time where the presentity is located, the current location of the presentity, the current status of the active terminals and/or applications running on active terminals and the status of services provided by the presentity 110. The PA 150 is further operable to provide the presence information to one or more watchers 170 (callers or communication session initiators) who have subscribed to the presence service of the presentity 110.

The presence server 160 further stores preference information 190 (e.g., terminal preferences) for the presentities 110 and watchers 170 of the presence system 100. For example, the preference information 190 can include both presentity preference information (e.g., privacy filters) set by the presentity 110 for each watcher 170 and watcher preference information (e.g., watcher filters) set by each watcher 170 for presentities 110. The preference information 190 operates to filter the presence information 180 of a presentity 110 provided to a watcher 170 to accommodate privacy concerns, prioritization requirements, administrator policies, security considerations and other individual preferences.

The presence server 160 is a physical entity that can operate as either the PA 150 or as a proxy server for routing requests from watchers 170 to the PA 150. The presence server 160 stores the presence information 180 and preference information 190 for a plurality of presentities 110 and watchers 170. Thus, the PA 150, in combination with the presence server 160, is operable to receive presence information of the presentity 110 from the PUAs 140, receive requests from watchers 170 for the presence information and provide the presence information to the watcher(s) 170. When acting as a PA 150, the presence server 160 can also be co-located with a PUA 140.

The presence system 100 uses a presence protocol to provide presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union—Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a caller (watcher) to transmit a SUBSCRIBE request for presence information relating to a particular callee (presentity 110) to be routed to the presence server 160 that maintains the presence information for the presentity 110. In operation, the presence server 160 and PA 150 may be co-located with the SIP proxy/registrar for efficiency purposes.

Figure 2:
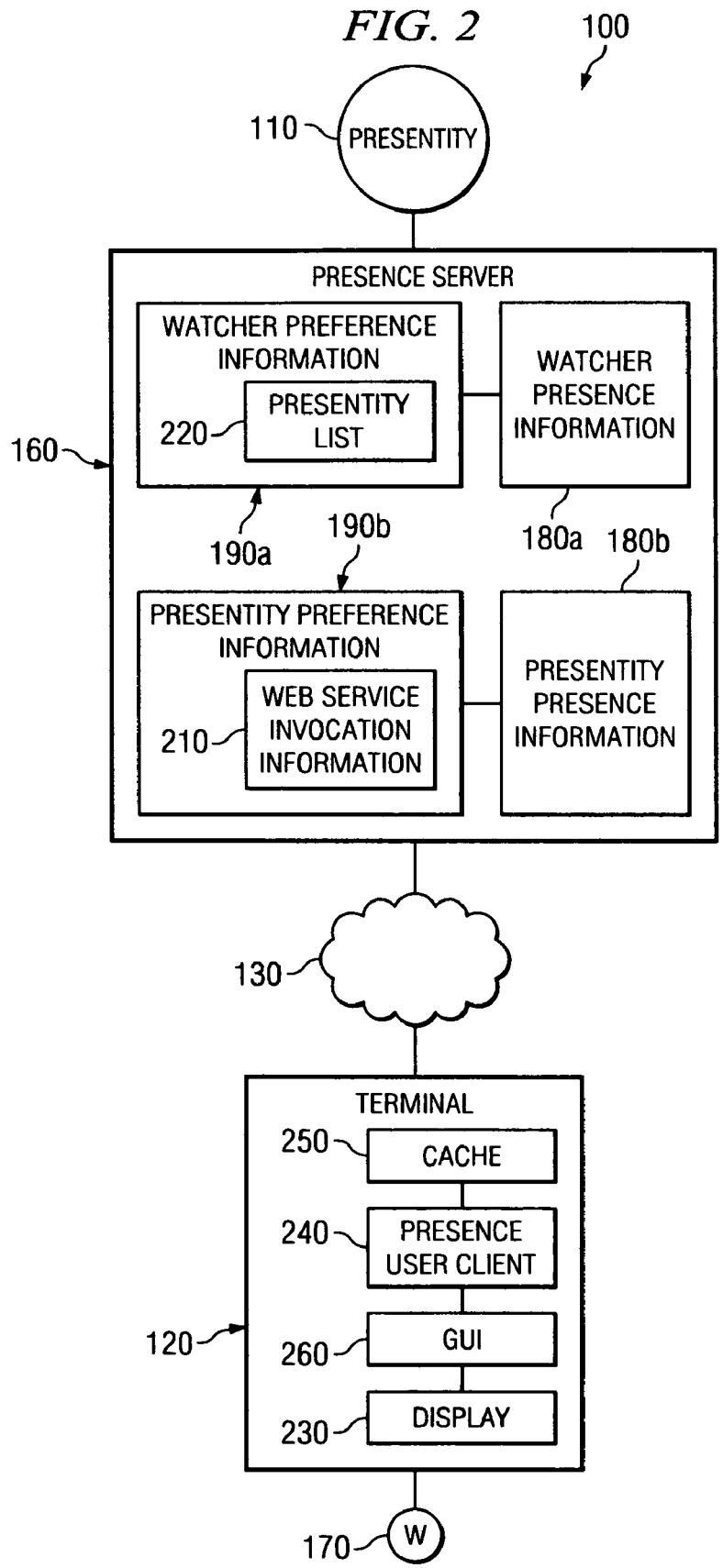
FIG. 2 illustrates an exemplary presence system for providing access to web services, in accordance with embodiments of the present invention.

FIG. 2 illustrates an exemplary presence system 100 for providing access to web services, in accordance with embodiments of the present invention. In FIG. 2, the presence server 160 maintains presentity presence information 180b associated with a particular presentity 110, presentity preference information 190b associated with the presentity 110, watcher presence information 180a associated with a particular watcher 170 of the presentity 110 and watcher preference information 190a associated with the watcher 170.

The watcher preference information 190a for watcher 170 includes a presentity list 220 containing the identities of all of the presentities and/or presentity groups for whom the watcher 170 is a watcher. The presence server 160 uses the presentity list 220 to update the watcher 170 with the current presence state of all presentities and/or presentity groups on the presentity list 220. For example, in one embodiment, the presence server 160 sends a notification message to the watcher 170 (e.g., using SIP/SIMPLE) to notify the watcher 170 of the current presence state of presentity 110. The notification message can be sent each time new presence information 180b is received for the presentity 110, each time the presence state of the presentity 110 changes or on a periodic basis.

In addition, in accordance with embodiments of the present invention, the presentity preference information 190b includes web service invocation information 210 providing access to one or more web services offered by the presentity 110. The presentity 110 provides the web service invocation information 210 to the presence server 160, which stores the web invocation information 210 in the presentity preference information 190b. For example, in one embodiment, the web service invocation information 210 includes a link to a website, e.g., a URL, associated with the presentity 110. In another embodiment, the web service invocation information 210 includes the URL, a text string and/or an icon, such as a company logo, picture of the presentity or other image selected by the presentity. The text string and/or icon visually depicts the URL to the watcher 170. For example, the text string and/or icon can be displayed to a watcher 170 of the presentity 110, and the watcher 170 can invoke the web service associated with the URL by "clicking on" the text string and/or icon.

As described above, the web service invocation information 210 stored in the presentity preference information 190b provides access to one or more web services associated with the presentity 110. For example, in one embodiment, the web service invocation information 210 includes a single URL to be provided to all watchers 170 of the presentity 110. In another embodiment, the web service invocation information 210 includes multiple URL's associated with the presentity 110. All or some of the URL's can be provided to each of the watchers 170 of the presentity 110.

For example, in one embodiment, the presentity 110 associates a watcher identifier identifying a single watcher or a group of watchers with one or more of the URL's. Each watcher identifier identifies a single watcher or a group of watchers to receive a particular URL. Correlating URLs with one or more watchers or watcher groups enables the presentity 110 to provide different URLs to different watchers. In this embodiment, the presence server 160 is operable to identify all watchers of the presentity 110, and, using the watcher identifiers, to determine the particular URL to provide to each watcher.

In another embodiment, the presentity 110 associates a presence state of the presentity 110 with one or more of the URLs. Correlating URLs with presentity presence states enables the presentity 110 to provide different URLs for different presence states (e.g., available, unavailable, service state) of the presentity 110. In this embodiment, the presence server 160 is operable to determine a current presence state of the presentity 110 and to provide the web service invocation information 210 for the URL associated with the current presence state to the watcher 170.

In a further embodiment, the presentity 110 associates both a watcher identifier and a presence state of the presentity 110 with one or more URLs. Correlating URLs with one or more watchers and presentity presence states enables the presentity 110 to provide different URLs to different watchers for different presence states (e.g., available, unavailable, service state) of the presentity 110. In this embodiment, the presence server 160 is operable to determine a current presence state of the presentity 110, and to determine the particular ULR to provide to each watcher for the current presence state.

The presence server 160 provides the web service invocation information 210 to the watcher 170 by transmitting the web service invocation information 210 to one or more terminals 120 of the watcher 170 (only one of which is shown for convenience) via the communication network 130. In one embodiment, the presence server 160 provides the web service invocation information 210 to the watcher terminal 120 during an initial registration of the watcher terminal 120 with the presence server 160. In another embodiment, the presence server 160 provides the web service invocation information 210 to the watcher terminal 120 during an initial subscription of the watcher 170 to the presence information 180b of the presentity 110.

In embodiments in which the presence server 160 receives the web service invocation information 210 from the presentity 110 after the watcher terminal 120 is registered and after the watcher 170 has subscribed to the presence information 180b of the presentity 110, the presence server 160 provides the web service invocation information 210 to the watcher terminal 120 upon receiving the web service invocation information 210 from the presentity 110. In a further embodiment, the presence server 160 provides the web service invocation information 210 periodically or with updated presence information 180b of the presentity 110. For example, if the presentity 110 has associated URLs with presence states of the presentity, the presence server 160 can provide the web service invocation information 210 of a URL associated with a current presence state of the presentity 110 to the watcher terminal 120.

Each watcher terminal 120 includes a presence user client 240 capable of interfacing with the presence server 160 to receive both the web service invocation information 210 and the presence information 180b of the presentity 110. In one embodiment, the web service invocation information 210 includes a URL to the website that provides a particular web service of the presentity 110. In another embodiment, the web service invocation information 210 includes a link to a website (e.g., URL) maintaining one or more URLs and/or graphical renderings (e.g., text string and/or icon) associated with web services of the presentity 110. In this embodiment, the presence user client 240 is further operable to retrieve the URL(s) and/or graphical rendering(s) from the website using the link.

The presence user client 240 is further capable of displaying the web service invocation information 210 and presence information 180b of the presentity 110 on the terminal 120. More particularly, the presence user client 240 is operable to receive the presentity presence information 180b indicating the current presence state of the presentity 110 and the appropriate web service invocation information 210 of the presentity 110 from the presence server 160, and to display the presentity presence information 180b and web service invocation information 210 on a terminal display 230 via a graphical user interface (GUI) 260. In one embodiment, the web service invocation information 210 displayed on the display 230 includes one or more URLs. In another embodiment, the web service invocation information displayed on the display 230 includes one or more text strings and/or icons representing one or more URLs.

In addition, the presence user client 240 further communicates with the presence server 160 to receive the presence information of other presentities. For example, the presence user client 240 can also maintain the presentity list 220 containing the identities of each presentity for whom the watcher 170 has subscribed to receive presence updates, and the presence server 160 can provide the presence state and web service invocation information of the presentities on the list to the presence user client 240 for display on the terminal display 230. As an example, the presence user client 240 can manage a contact list or "Buddy List" of the watcher 170 and display in real-time the presence state/web service invocation information for each presentity on the contact list. Thus, the presence user client 240 is capable of displaying a respective URL (or graphical rendering representing the URL) for each presentity or group of presentities on the presentity list 220.

As described above, the presence user client 240 is capable of retrieving the web service invocation information 210 for each presentity or group of presentities in the presentity list 220 from the presence server 160 during an initial registration of the terminal 120, during an initial subscription for each presentity or presentity group in the presentity list 110 or on-demand. In accordance with further embodiments of the present invention, the presence user client 240 is also capable of storing the web service invocation information 210 for one or more presentities and/or presentity groups in the presentity list 220 within a cache 250. The web service invocation information 210 stored in the cache 250 includes the web service invocation information 210 (e.g., a URL, or a URL along with a text string and/or icon) for one or more URLs to be used for one or more presentities or groups of presentities in the presentity list 220. For example, in one embodiment, the presence user client 240 uses the cache 250 to display at least one URL out of a set of URLs stored in the cache 250 for each presentity in the presentity list 220. By caching the web service invocation information 210 within the terminal 120, the presence system 100 avoids subsequent re-transmission of the web service invocation information 210 to the terminal 120, which reduces the traffic load on the communication network 130.

In embodiments in which web service invocation information 210 is stored in the cache 250, the presence server 160 is operable to assign a web service identifier to each of the URLs (and associated text strings and/or icons) associated with the presentity 110. In addition, the presence server 160 is further operable to include the web service identifiers in the web service invocation information 210 sent to the presence user client 240. Thus, the web service invocation information 210 stored in the presence server 160 and in the cache 250 further includes a respective web service identifier for one or more of the URLs stored therein. Once the web service identifiers for the URLs have been provided to the presence user client 240 and stored in the cache 250, the presence server 160 can send the assigned web service identifier for a current URL, instead of the URL itself. In embodiments in which the web service invocation information 210 includes not only a URL, but also a text string and/or icon, the traffic load on the network is significantly reduced by caching the text string and/or icon along with the URL within the cache 250 and sending only the web service identifier identifying the URL and associated text string and/or icon to the terminal 120.

In an exemplary embodiment in which each of the URLs of the presentity 110 is associated with a different presence state of the presentity, the presence server 160 is further operable to determine a current presence state of the presentity and to provide the web service identifier associated with the current presence state to the presence user client 240. For example, when the presence server 160 sends a new notification message to the presence user client 240 notifying the watcher 170 of the current presence state of the presentity 110, the presence server 160 can include the web service identifier for one of the URLs of the presentity 110 in the notification message.

The presence user client 240 indexes on the cache 250 using the received web service identifier to retrieve the web service invocation information 210 for the URL associated with the received web service identifier. The presence user client 240 further uses the retrieved web service invocation information 210 to generate and display the URL and/or text string and/or icon on the display 230 via the GUI 260.

As used herein, the term "presence user client" 240 refers to any hardware, software, firmware, or combination thereof for interfacing with the presence server 160. As an example, the presence user client 240 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein.

Figure 3:
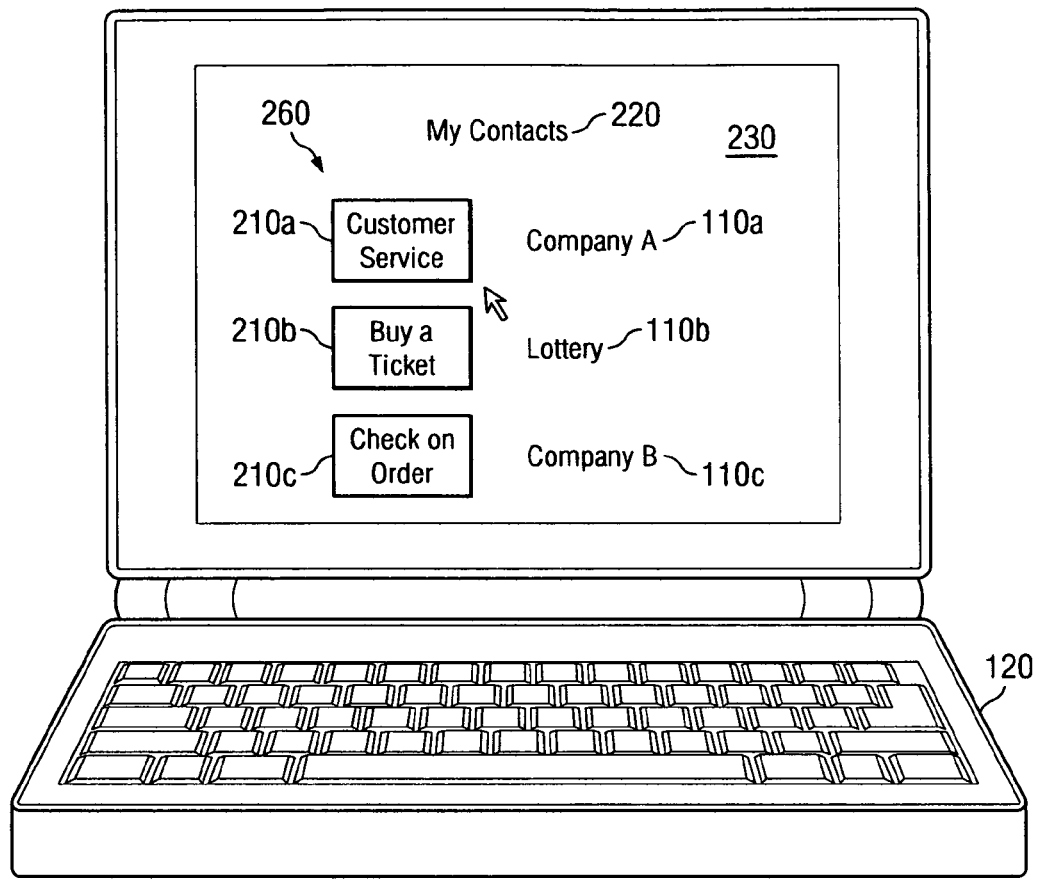
FIG. 3 illustrates an exemplary graphical user interface for enabling presence-based access to web services.

FIG. 3 illustrates an exemplary graphical user interface (GUI) 260 on a display 230 of a terminal 120 for enabling presence-based access to web services. The GUI 260 displays to the watcher the presentity list 220 containing the identities of each presentity 110a, 110b and 110c for whom the watcher has subscribed to receive presence updates and the web service invocation information 210a, 210b and 210c for each of the presentities 110a, 110b and 110c, respectively, on the presentity list 220. The web service invocation information 210a-210c enables the watcher to invoke a respective web service for each of the presentities 110a-110c.

For example, as shown in FIG. 3, the GUI 260 displays "My Contacts" 220 including Company A 110a, Lottery 110b and Company B 110c. In addition, for Company A 110a, the GUI displays the text string "Customer service" as the web service invocation information 210a of Company A 110a. The text string "Customer Service" is included within a box and is used to link to the customer service website of Company A 110a. Therefore, if the watcher desires to contact the customer service website of Company A 110a, the watcher simply "clicks on" the box containing the text string "Customer Service" 210a to automatically access the customer service website of Company A 110a.

As another example, for Lottery 110b, the GUI displays the text string "Buy a Ticket" as the web service invocation information 210b of Lottery 110b. The text string "Buy a Ticket" is included within a box and is used to link to the website of the Lottery 110*b*. Therefore, if the watcher desires to buy a lottery ticket, the watcher simply "clicks on" the box containing the text string "Buy a Ticket" 210*b* to automatically access the website, and possibly the appropriate webpage within the website, of Lottery 110*b* to buy a lottery ticket. As a further example, for Company B 110*c*, the GUI displays the text string "Check on Order" as the web service invocation information 210*c* of Company B 110*c*. The text string "Check on Order" is included within a box and is used to link to the website of Company B 110*b*. Therefore, if the watcher desires to check on the status of an order for goods or services placed with Company B 110*c*, the watcher simply "clicks on" the box containing the text string "Check on Order" 210*c* to automatically access the appropriate website (and possibly webpage within the website) of Company B 110*c* to check on the status of the order.

Figure 4:
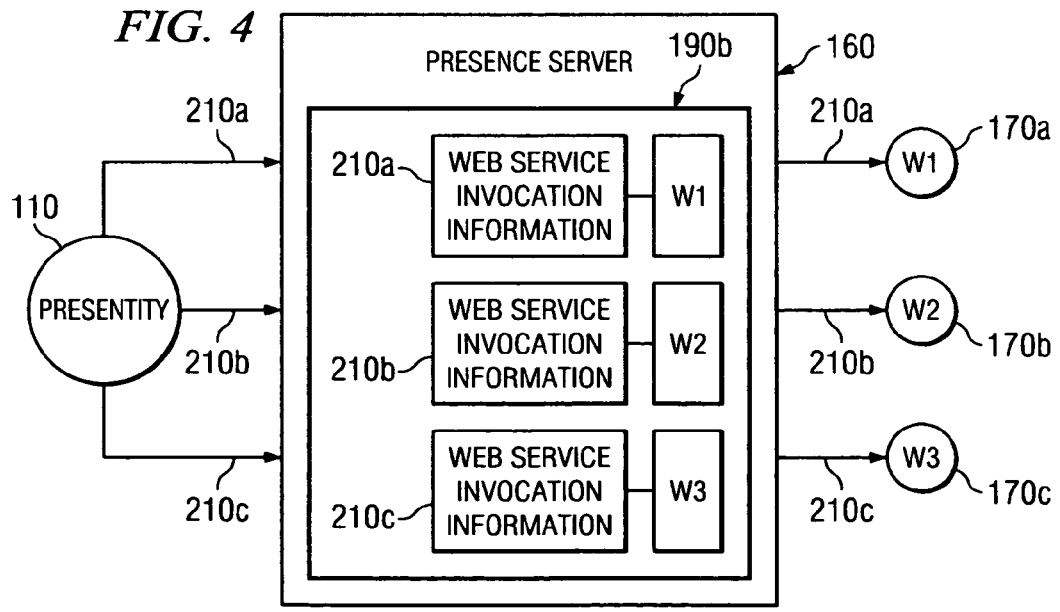
FIG. 4 illustrates an exemplary presence system for providing different web services to different watchers, in accordance with embodiments of the present invention.

FIG. 4 illustrates an exemplary presence system 100 for providing different web service invocation information 210 to different watchers, in accordance with embodiments of the present invention. In FIG. 4, three watchers 170*a*, 170*b* and 170*c*, referred to as W1, W2 and W3, respectively, are shown. The presentity 110 has associated different web service invocation information 210*a*-210*c* with each watcher 170*a*-170*c*, respectively. Thus, within the presentity preference information 190*b* in the presence server 160 is stored respective web service invocation information 210*a*-210*c* for each watcher 170*a*-170*c*, respectively.

For example, as shown in FIG. 4, the presence server 160 maintains first web service invocation information 210*a* defining a first URL for watcher W1, second web service invocation information 210*b* defining a second URL for watcher W2 and third web service invocation information 210*c* defining a third URL for watcher W3. In addition, the presence server 160 provides the first web service invocation information 210*a* to watcher W1 to enable watcher W1 to access the web service associated with the first URL on a watcher terminal of W1, the second web service invocation information 210*b* to watcher W2 to enable watcher W2 to access the web service associated with the second URL on a watcher terminal of W2 and the third web service invocation information 210*c* to watcher W3 to enable watcher W3 to access the web service associated with the third URL on a watcher terminal of W3.

Figure 5:
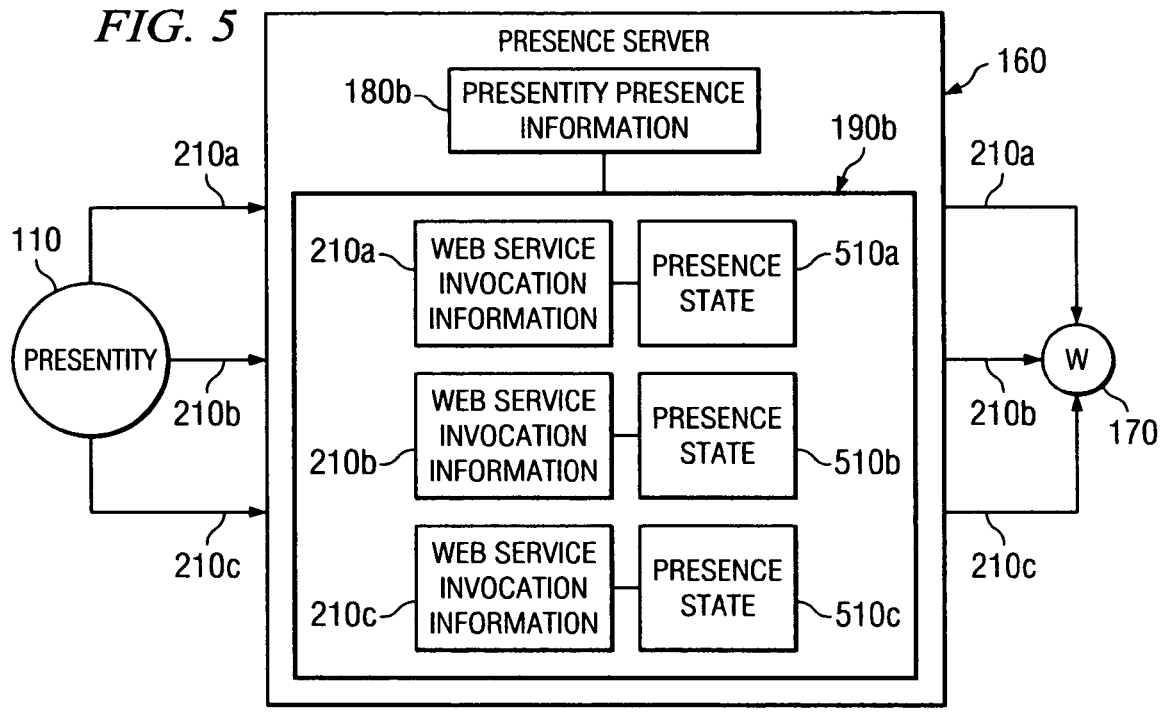
FIG. 5 illustrates an exemplary presence system for providing different web services for different presence states, in accordance with embodiments of the presence invention.

FIG. 5 illustrates an exemplary presence system for providing different web service invocation information 210 for different presence states, in accordance with embodiments of the present invention. In FIG. 5, a single watcher 170 is shown for presentity 110. However, presentity 110 has associated three different presence states 510*a*-510*c* with different web service invocation information 210*a*-210*c*, respectively. In an exemplary embodiment, the presence state of the presentity 110 shown in FIG. 5, refers to the state of a service provided by the presentity 110 to the watcher 170.

For example, if the watcher 170 is a customer of the presentity 110, the "presence state" of the presentity may be dependent upon the state of the customer service queue and/or the state of a particular service for the watcher. Using the example shown in FIG. 5, the first presence state 510*a* can indicate that no service requests from the watcher are pending at this time, and therefore, the URL included in the web service invocation information 210*a* can be a link to a webpage that enables the watcher to request a service (e.g., place an order for a good or service), the second presence state 510*b* can indicate that there are one or more service requests are in the queue, and therefore, the URL included in the web service invocation information 210*b* can be a link to a webpage that provides a wait time for processing the service request, and the third presence state 510*c* can indicate that one or more service requests are currently being processed, and therefore, the URL included in the web service invocation information 210*c* can be a link to a webpage that provides an update on the status of each service request.

In one embodiment, the presence server 160 provides all of the web service invocation information 210*a*-210*c*, along with a respective web service identifier for each web service invocation information 210*a*-210*c*, to the watcher 170 during an initial registration or subscription process, and the watcher 170 stores the web service invocation information 210*a*-210*c* within one or more watcher terminals. Thereafter, the presence server 160 transmits the web service identifier for the current presence state 510*a*-510*c* of the presentity 110 to the watcher 170 for use in displaying the URL or URL and text string and/or icon associated with the current presence state 510*a*-510*c*. In another embodiment, the presence server 160 provides the appropriate web service invocation information 210*a*, 210*b* or 210*c* (e.g., URL or URL and text string and/or icon) to the watcher 170 depending on the current presence state 510*a*, 510*b* or 510*c*, respectively, of the presentity 110.

Figure 6:
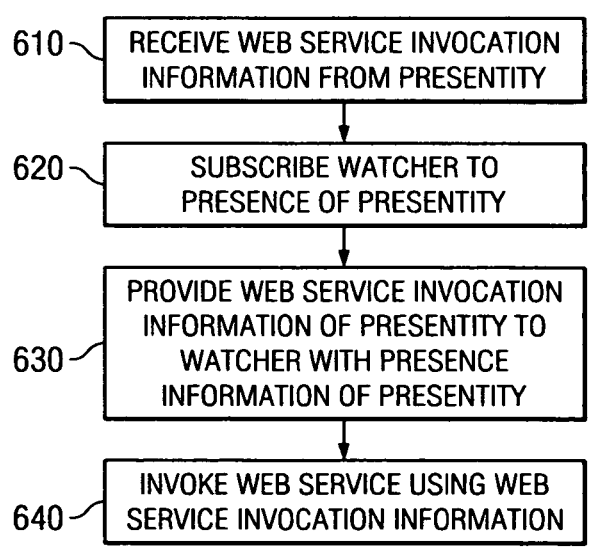
FIG. 6 is a flowchart illustrating an exemplary process for providing presence-based access to web services, in accordance with embodiments of the present invention.

FIG. 6 is a flowchart illustrating an exemplary process 600 for providing 5 presence-based access to web services, in accordance with embodiments of the present invention. The process begins at block 610 where a presentity provides web service invocation information for providing access to one or more web services of the presentity to the presence server. For example, in one embodiment, the web service invocation information includes a URL for the web service. In another embodiment, the web service invocation information includes a URL, along with a text string and/or icon representing the URL. In other embodiments, the web service invocation information includes a link to a website containing the URL and/or text string/icon.

At block 620, the presence server subscribes a watcher to the presence of the presentity. In one embodiment, the watcher subscribes to the presence of the presentity prior to the presence server receiving the web service invocation information, thereby enabling the presentity to customize URLs for watchers and/or presence states of the presentity. In another embodiment, the watcher subscribes to the presence of the presentity after the presence server receives the web service invocation information.

The process continues at block 630, where the presence server provides the web service invocation information of the presentity, along with the presence information of the presentity, to the watcher. For example, in one embodiment, the presence server determines the identity of the watcher, and using the watcher identity, determines the particular web service invocation information to provide to the watcher. In another embodiment, the presence server determines a current presence state of the presentity and provides the web service invocation information for the URL associated with the current presence state to the watcher. Thereafter, at block 640, the watcher invokes a web service of the presentity 110 using the web service invocation information provided to the watcher.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A presence system for providing access to web services, comprising:
   a presence server for collecting and storing presence information on a presentity and providing said presence information to watchers of said presentity;
   wherein said presence server is further operable to receive web service invocation information from said presentity, said web service invocation information providing access to one or more web services of said presentity;
   wherein said presence server is further operable to provide said presence information and said web service invocation information of said presentity to said watchers of said presentity for use by said watchers in invoking said one or more web services of said presentity.

2. The presence system of claim 1, wherein said web service invocation information associates a respective watcher identity with each of said one or more web services, and wherein said presence server is further operable to provide to at least a select one of said watchers said web service invocation information for a select one of said one or more web services associated with said watcher identity of said select one of said watchers.

3. The presence system of claim 1, wherein said web service invocation information associates a respective presence state of said presentity with each of said one or more web services, and wherein said presence server is further operable to determine a current presence state of said presentity and to provide said web service invocation information for a select one of said one or more web services associated with said current presence state to at least one of said watchers.

4. The presence system of claim 1, further comprising:
   a presence user client associated with a select one of said watchers operable to receive said web service invocation information from said presence server and to provide said web service invocation information to said select one of said watchers.

5. The presence system of claim 4, further comprising:
   a terminal on which said presence user client is running, said terminal having a display and a graphical user interface operably coupled to said display for displaying said web service invocation information for at least a select one of said one or more web services, said graphical user interface being further operably coupled to said presence user client for enabling said select one of said watchers to invoke said select one of said one or more web services using said displayed web service invocation information.

6. The presence system of claim 5, wherein said presence user client further maintains a list of presentities for whom said select one of said watchers is a watcher, and enables respective web service invocation information to be displayed on said display for each of said presentities on said list.

7. The presence system of claim 4, wherein said presence user client is further operable to maintain said web service invocation information within a cache associated with said select one of said watchers.

8. The presence system of claim 7, wherein said presence server is further operable to assign a web service identifier to each of said one or more web services associated with said presentity and to include within said web service invocation information said web service identifier for each of said one or more web services provided to said presence user client of said select one of said watchers.

9. The presence system of claim 8, wherein said presence server is further operable to receive said presence information for said presentity and to provide said presence information and said web service identifier associated with said presence information of said presentity to said presence user client, and wherein said presence user client indexes on said cache using said received web service identifier to retrieve and display said web service invocation information associated with said received web service identifier.

10. The presence system of claim 9, wherein said web service invocation information further associates a respective presence state of said presentity with each of said one or more web services, and wherein said presence server is further operable to determine a current presence state from said presence information of said presentity and to provide said web service identifier associated with said current presence state to said presence user client.

11. The presence system of claim 4, wherein said web service information includes a link to a website providing a select one of said web services, and wherein said presence user client is further operable to access said select web service using said link.

12. The presence system of claim 11, wherein said web service invocation information further includes a text string associated with at least one of said one or more web services.

13. The presence system of claim 11, wherein said web service invocation information further includes an image associated with at least one of said one or more web services.

14. A method for providing presence-based access to web services, comprising the steps of:
    receiving web service invocation information from a presentity, said web service invocation information providing access to one or more web services of said presentity;
    subscribing watchers to presence information of said presentity; and
    providing said presence information and said web service invocation information of said presentity to said watchers for use by said watchers in invoking said one or more web services of said presentity.

15. The method of claim 14, wherein said receiving further includes:
    associating a respective watcher identity with each of said one or more web services accessible through said web service invocation information, wherein each said watcher identity identifies one or more of said watchers, and wherein said providing further includes:
    providing to a select one of said one or more watchers said web service invocation information of a select one of said one or more web services associated with said watcher identity of said select one of said watchers.

16. The method of claim 14, wherein said receiving further includes:
    associating a respective presence state of said presentity with each of said one or more web services accessible through said web service invocation information, and wherein said providing further includes:
    determining a current presence state of said presentity; and
    providing said web service invocation information of a select one of said one or more web services associated with said current presence state to at least one of said watchers.

17. The method of claim 14, further comprising the steps of:
    receiving said web service invocation information for at least a select one of said one or more web services at a select one of said watchers; and
    enabling said select one of said watchers to invoke said select one of said one or more web services using said web service invocation information.

18. The method of claim 17, further comprising:
maintaining said web service invocation information within a cache associated with said select one of said watchers.

19. The method of claim 18, wherein said providing further comprises:
assigning a web service identifier to each of said one or more web services associated with said presentity; and
including within said web service invocation information provided to said select one of said watchers said web service identifier for each of said one or more web services provided to said select one of said watchers.

20. The method of claim 19, further comprising:
receiving said presence information for said presentity;
providing said presence information and said web service identifier associated with said presence information of said presentity to said select one of said watchers; and
indexing on said cache using said received web service identifier to retrieve and display said web service invocation information associated with said received web service identifier.

* * * * *